March 27, 1951 C. G. AMENDT 2,546,711
SCOOTER
Filed Oct. 19, 1948 2 Sheets-Sheet 1
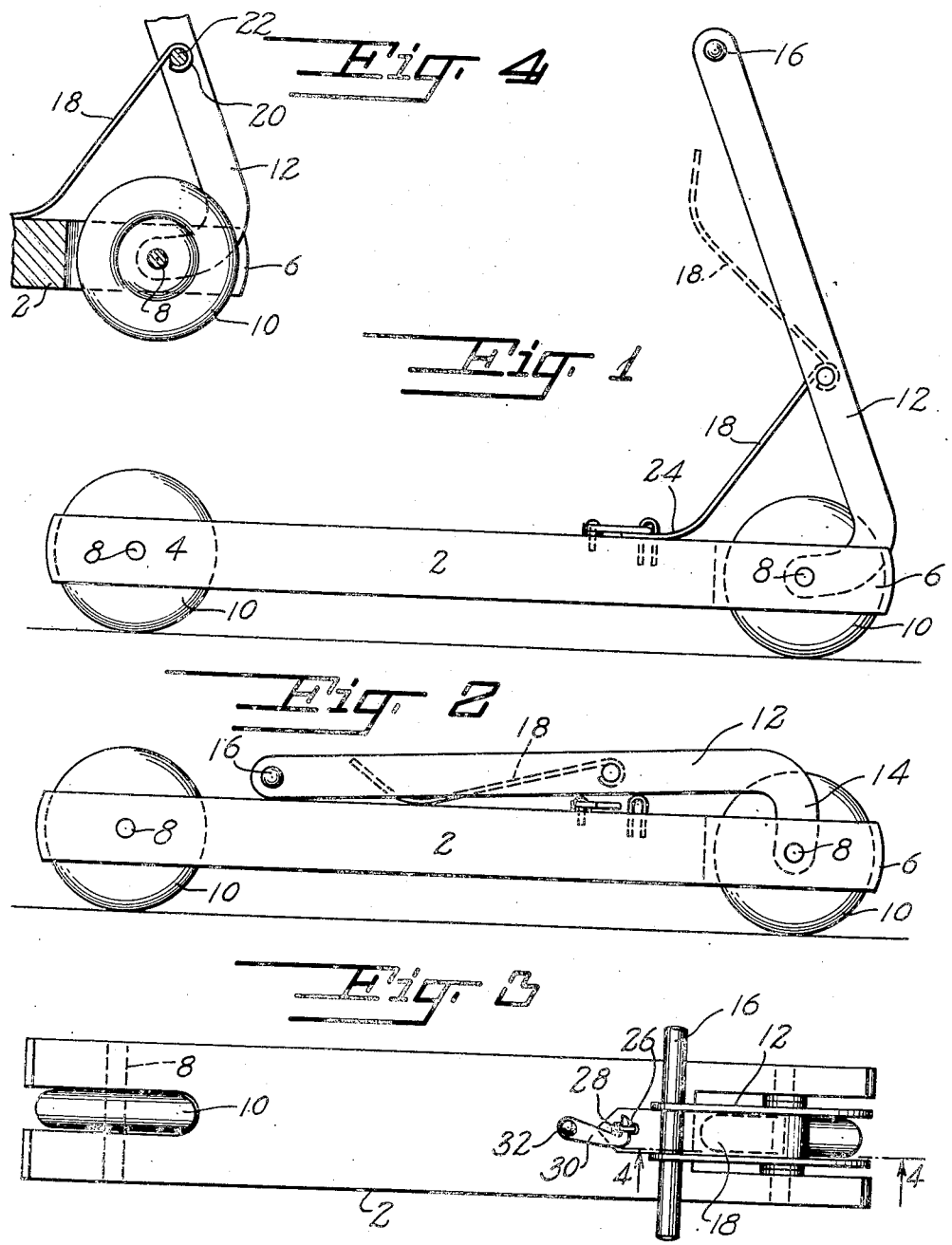
INVENTOR.
C. G. Amendt
BY Victor J. Evans & Co.
ATTORNEYS March 27, 1951　　C. G. AMENDT　　2,546,711
SCOOTER
Filed Oct. 19, 1948　　　　　　　　2 Sheets-Sheet 2
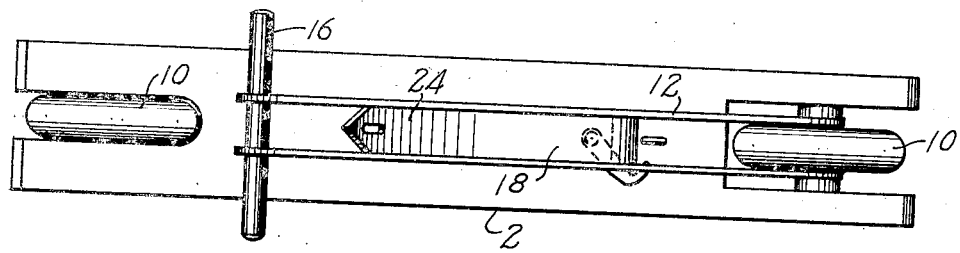
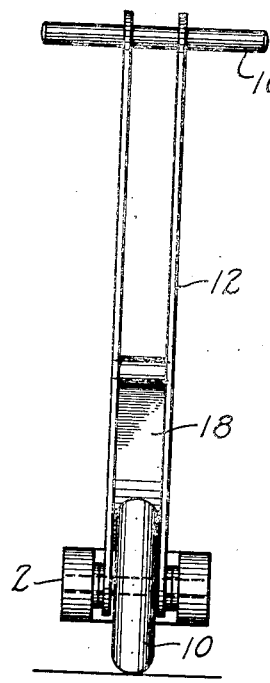 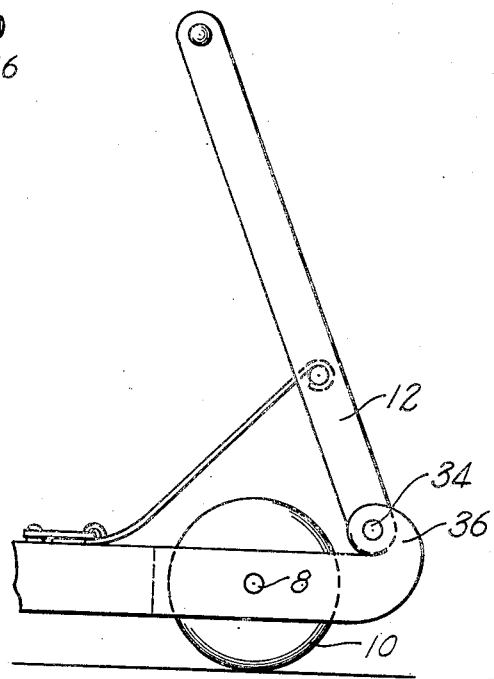 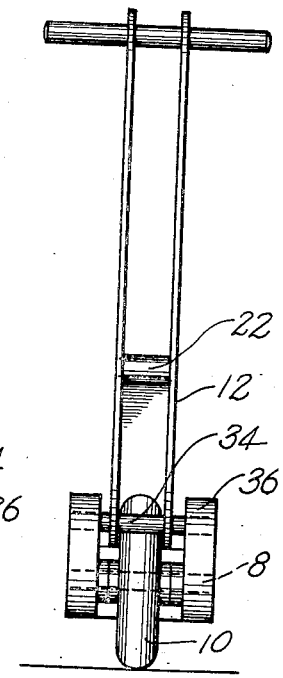
INVENTOR.
C. G. Amendt
BY *Victor J. Evans & Co.*
ATTORNEYS Patented Mar. 27, 1951

2,546,711

UNITED STATES PATENT OFFICE 2,546,711

SCOOTER

Charles G. Amendt, Lancaster, Ohio

Application October 19, 1948, Serial No. 55,365

3 Claims. (Cl. 280—87.05)

My present invention relates to an improved scooter of the manually propelled type customarily used by children as a toy vehicle.

From their essential shape scooters, usually having a wheeled platform or base and an upright steering handle, are difficult to store when not in use and when left lying on the lawn or sidewalk, are dangerous hazards to pedestrians.

I propose a scooter wherein the handle is made so as to be pivotal in order that it may be folded upon the base when not in use. I also employ novel means for securing the pivotal handle in operating position.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of the scooter of my invention ready for use.

Fig. 2 is a similar view with the handle folded for storage.

Fig. 3 is a top plan view of the scooter as seen in Fig. 1.

Fig. 4 is a sectional view at line 4—4 of Fig. 3.

Fig. 5 is a top plan view of the scooter as seen in Fig. 2.

Fig. 6 is a rear elevational view.

Fig. 7 is a partial side elevational view showing a modified construction of the locking mechanism.

Fig. 8 is a front elevational view thereof.

Referring now to the drawings wherein I have illustrated the present preferred embodiment of my invention I have shown a base or support for the rider 2 having fore and aft arms 6 and 4 respectively in which are journaled the axles 8 for the wheels 10.

The handle comprises a pair of flat bars 12 formed with angular ends 14 journaled on the front axle 8 and a connecting bar 16 provides hand grips for the rider.

In order to secure the pivoted handle in upright position I use a brace bar 18 having the upper end curled at 20 to form a journal for shaft 22 secured between the bars 2 and the free end of this bar 18 is angularly disposed at 24 to rest in flat position on the base 2 when in upright position.

The end 24 is slotted at 26 to receive the staple 28 imbedded in the base 2, and a hook 30 is pivotally secured on the base by pin 32.

In Figs. 7 and 8, I have shown the pivot pin 34 for the handle journaled in the upper curved extensions 36 of base 2.

When folded down as for storage the brace bar will fit between the parallel bars 12 and the angular end 24 as well as the body 20 of the brace bar will be confined within the planes of the edges of the bars 12.

Thus for storage the height of the scooter is materially reduced and it may easily be put away for future use and the handle may with facility be raised and secured in position.

Having thus fully described my invention what I claim as new and desire to secure by Letters Patent is:

1. In a scooter having a base provided fore and aft with oppositely disposed arms forming a wheel receiving recess and axles journalled in the arms transversely of the base for rotatably mounting supporting wheels thereon the improvement comprising, a handle formed of a pair of complementary shaped flat bars, a handlebar fixed in the upper ends of the flat bars at right angles thereto, alined apertures in the lower ends of the flat bars for pivotally mounting the handle on the base, a pivot pin carried by the bars transversely thereof, a brace bar pivotally mounted on said pin, and said brace bar having a flat free end provided with a slot therein, a fastening means on said base adapted to be received in the slot in the brace bar and latching means on said base adjacent said fastening means and adapted to coact with said fastening means above the free end of said brace bar to retain the free end of said brace bar on said fastening means.

2. A scooter as in claim 1 wherein the free ends of the flat bars forming the handles are angled with relation to the plane of the bars and the apertures therein are adapted to be received on the axle at the front of the base to pivotally mount the flat bars on the base.

3. A scooter as in claim 1, wherein the base at the fore portion thereof is provided with a pair of upwardly curved apertured extensions, a pivot pin mounted in said apertured extensions and the free ends of said flat bars are pivotally mounted on said pivot pin.

CHARLES G. AMENDT.

REFERENCES CITED

The following references are of record in the file of this patent:

UNITED STATES PATENTS

| Number | Name | Date |
|---|---|---|
| 1,192,514 | Gibson | July 25, 1916 |
| 1,227,888 | Converse | May 29, 1917 |
| 1,367,965 | Hayes | Feb. 8, 1921 |
| 2,170,978 | Smith | Aug. 29, 1939 |

FOREIGN PATENTS

| Number | Country | Date |
|---|---|---|
| 174,175 | Great Britain | Jan. 18, 1922 |